June 14, 1932.　　　R. O. WATKINS　　　1,863,175
GRID PASTING MACHINE
Filed June 27, 1929　　12 Sheets-Sheet 1
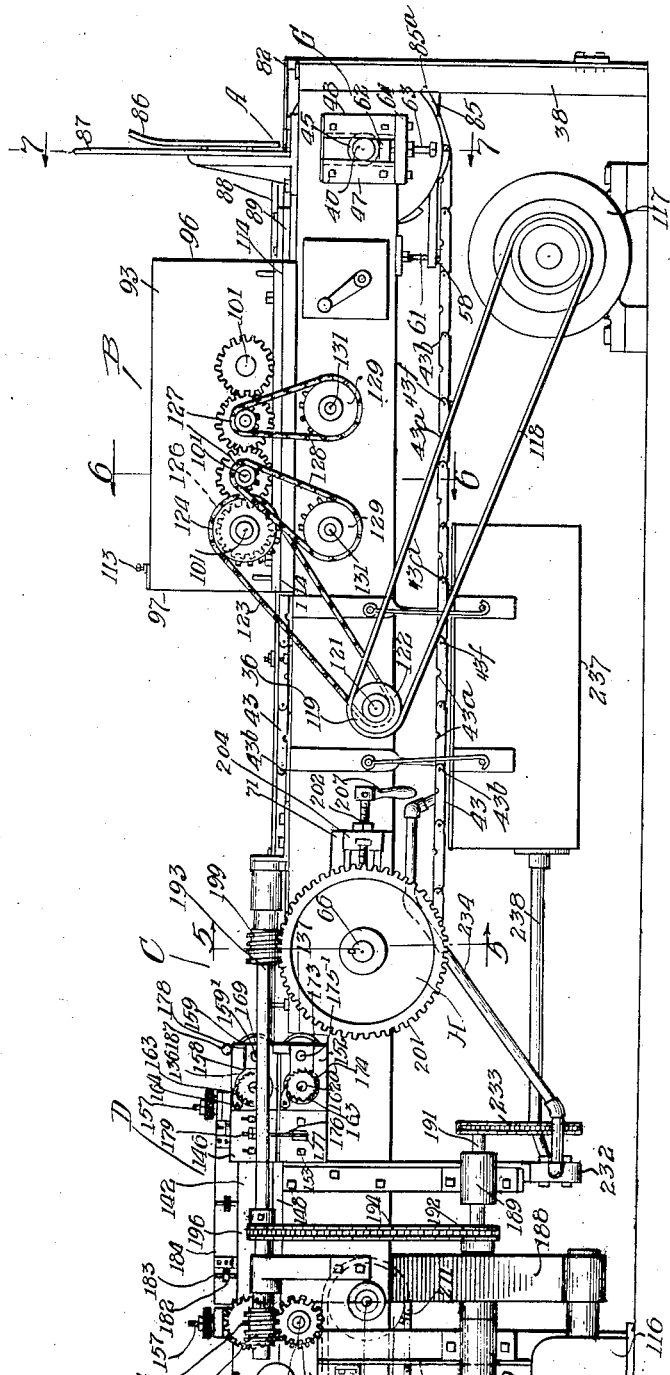

June 14, 1932.  R. O. WATKINS  1,863,175
GRID PASTING MACHINE
Filed June 27, 1929   12 Sheets-Sheet 2
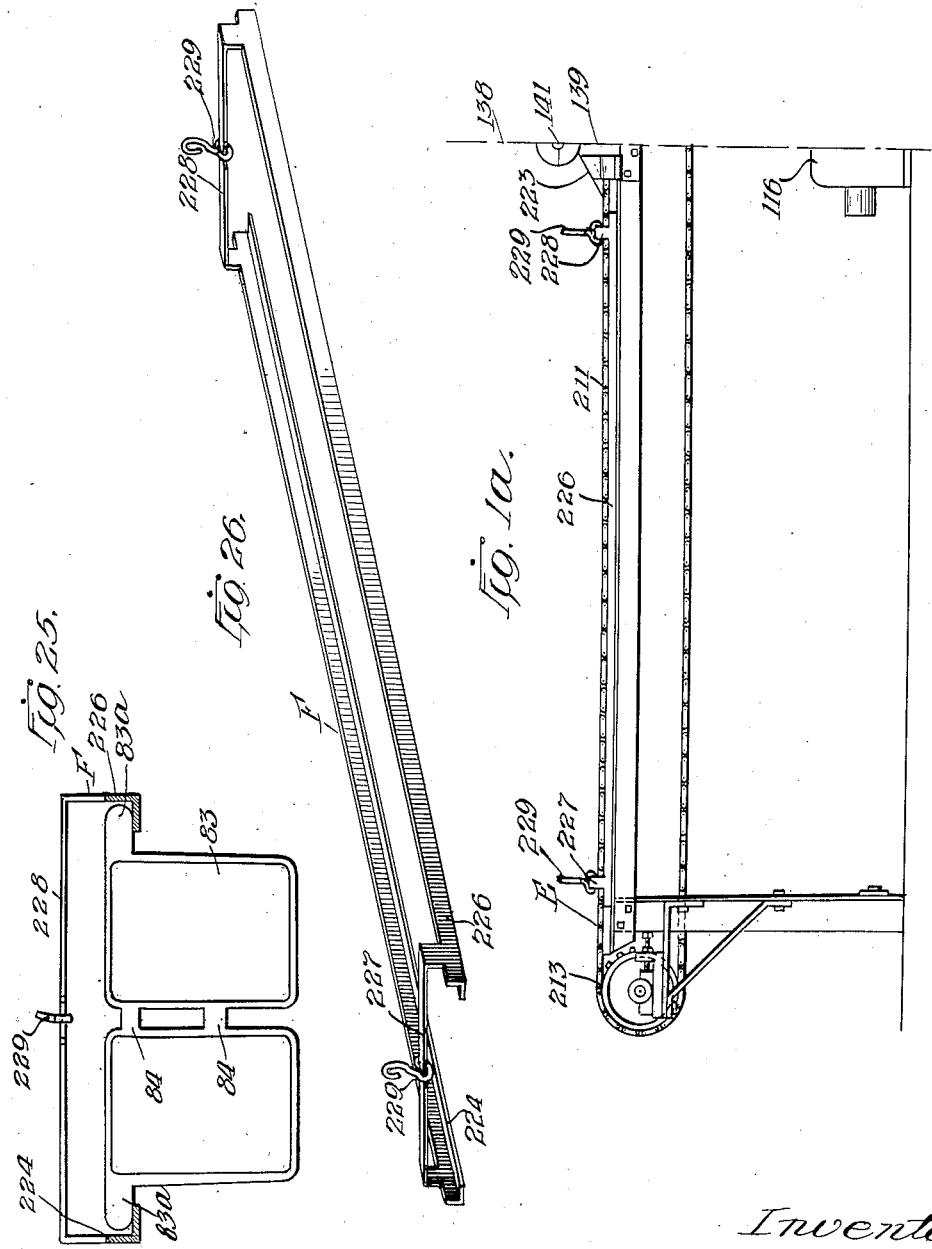
Witnesses:
Harry R. L. White
Robert Cremer
Inventor:
Ray O. Watkins
By George E. Mueller
Attorney.

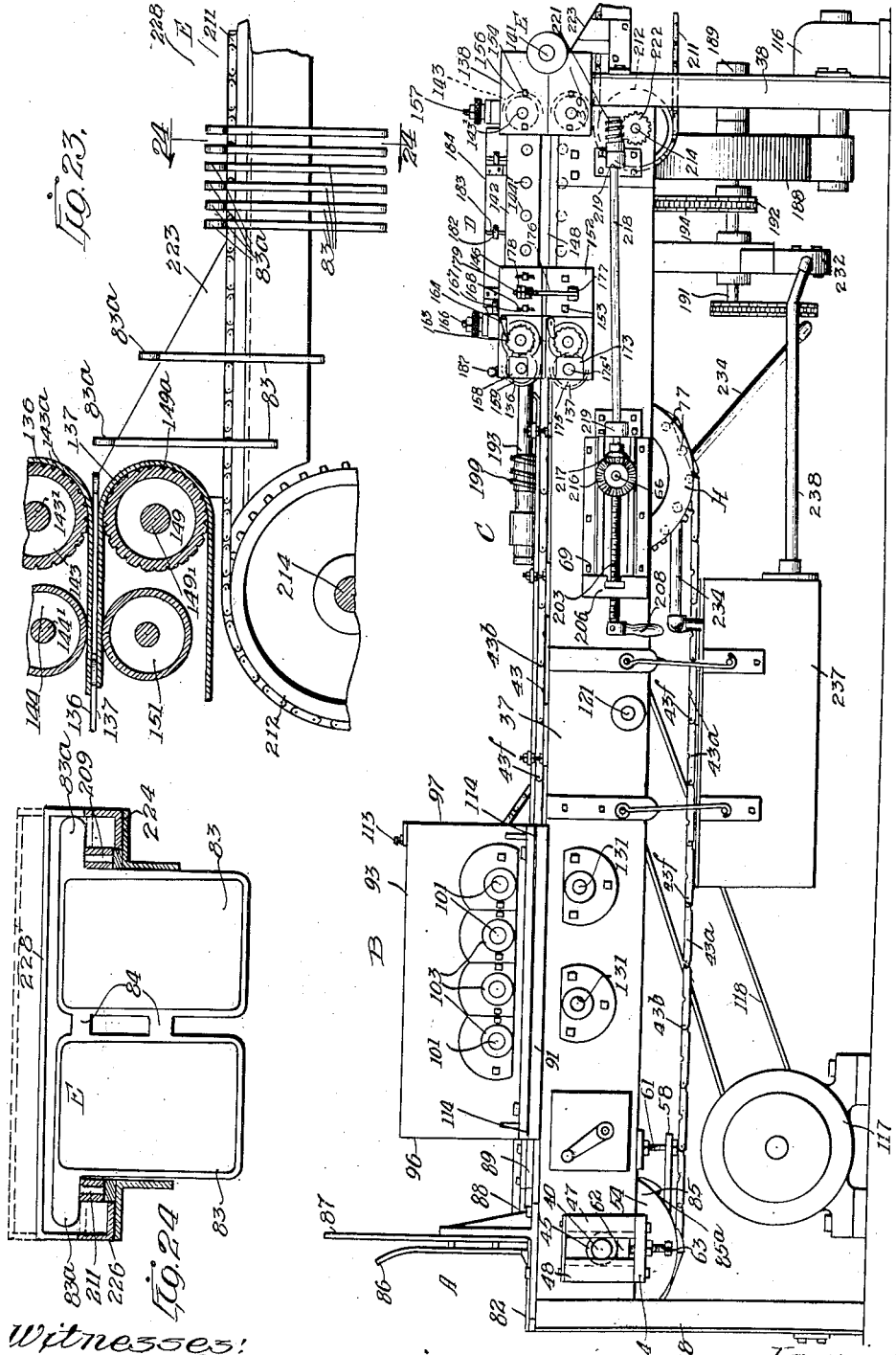

June 14, 1932.   R. O. WATKINS   1,863,175
GRID PASTING MACHINE
Filed June 27, 1929   12 Sheets-Sheet 4
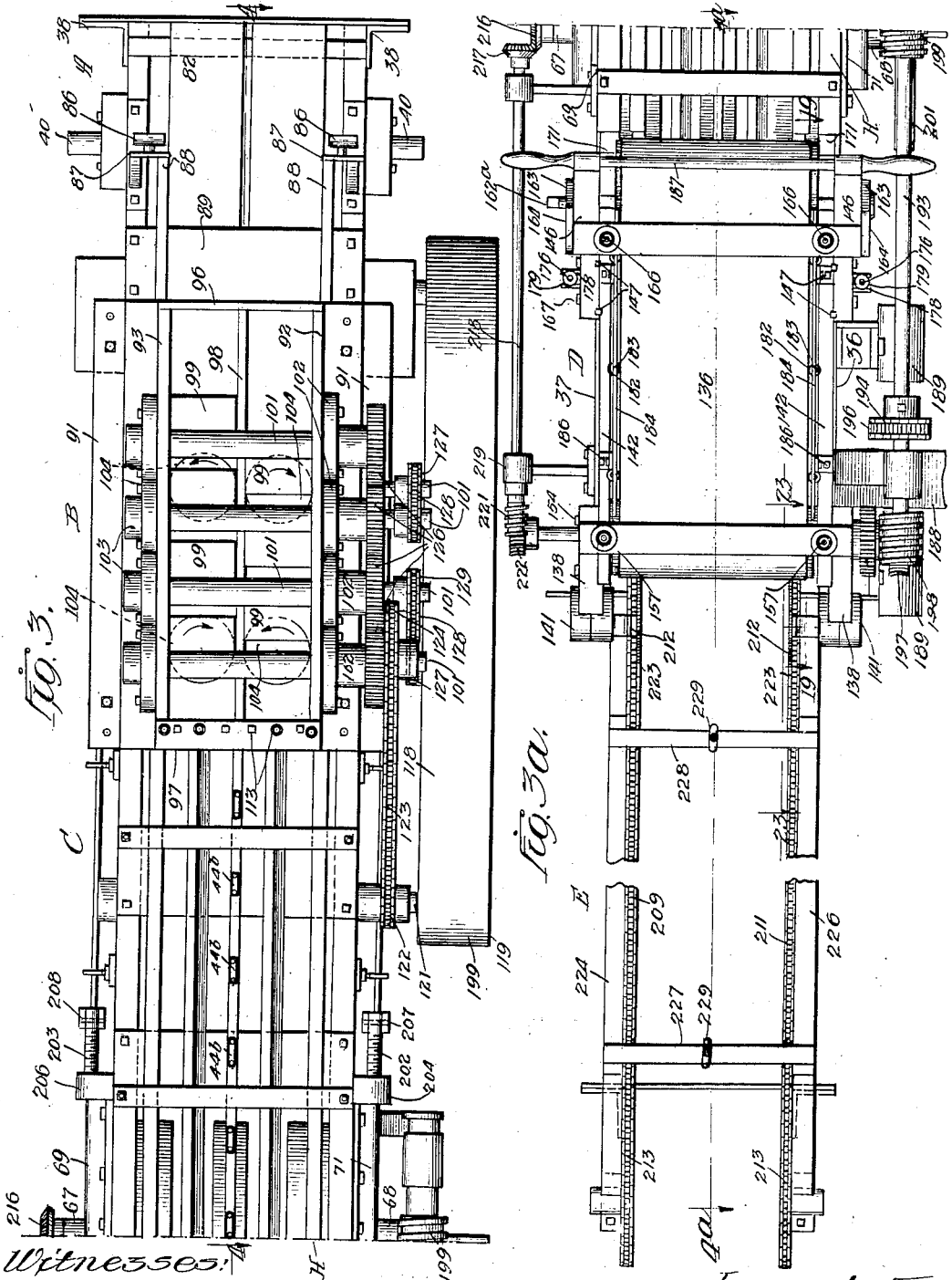
Witnesses:
Harry P. L. White
Robert Cremer
Inventor
Ray O. Watkins
By George E. Mueller
Attorney

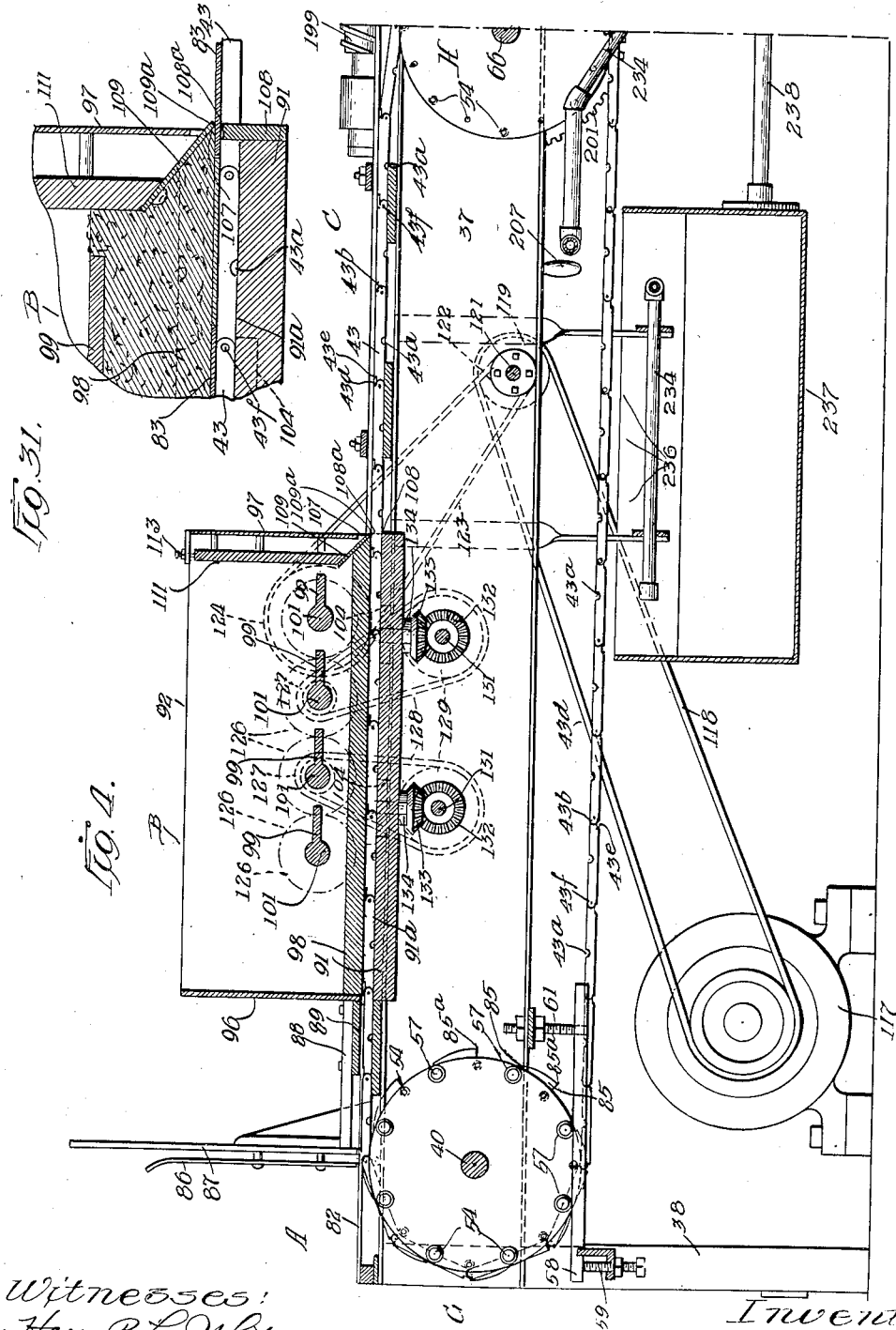

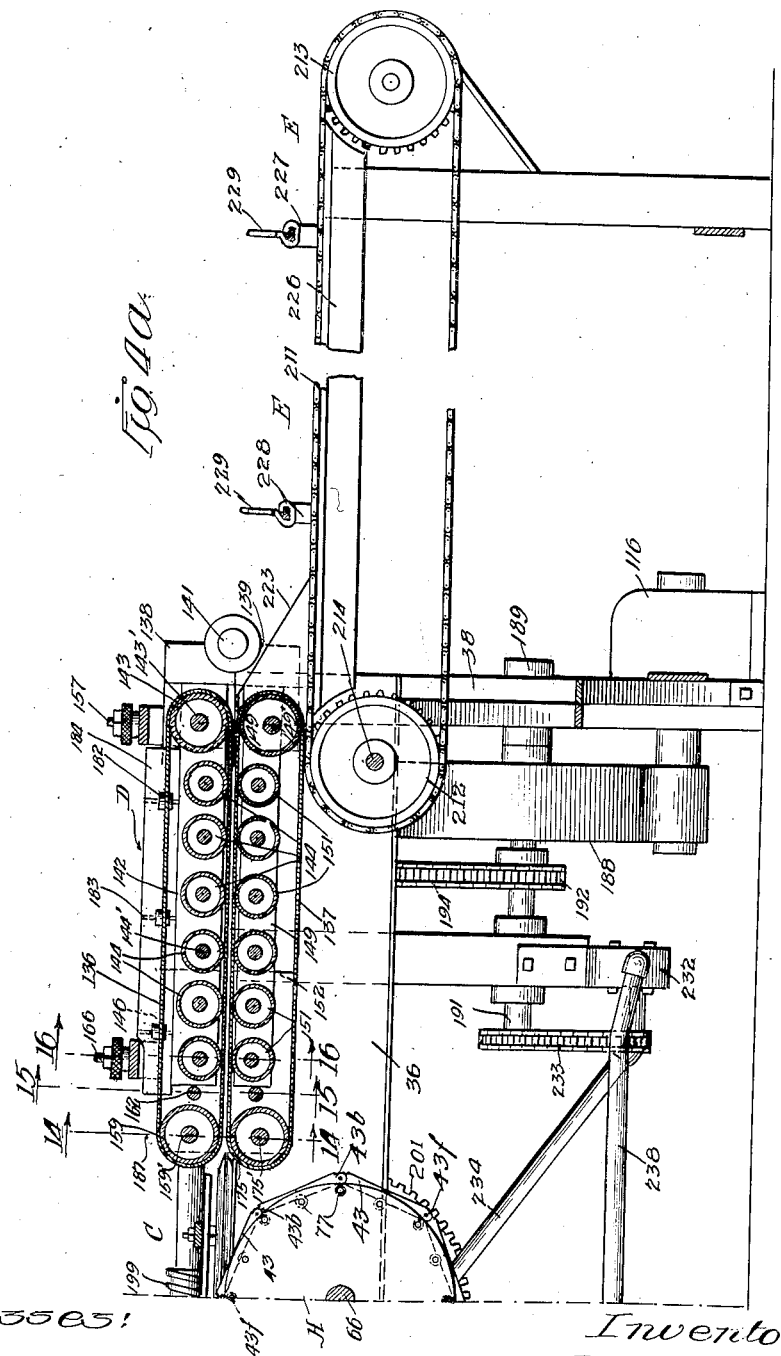

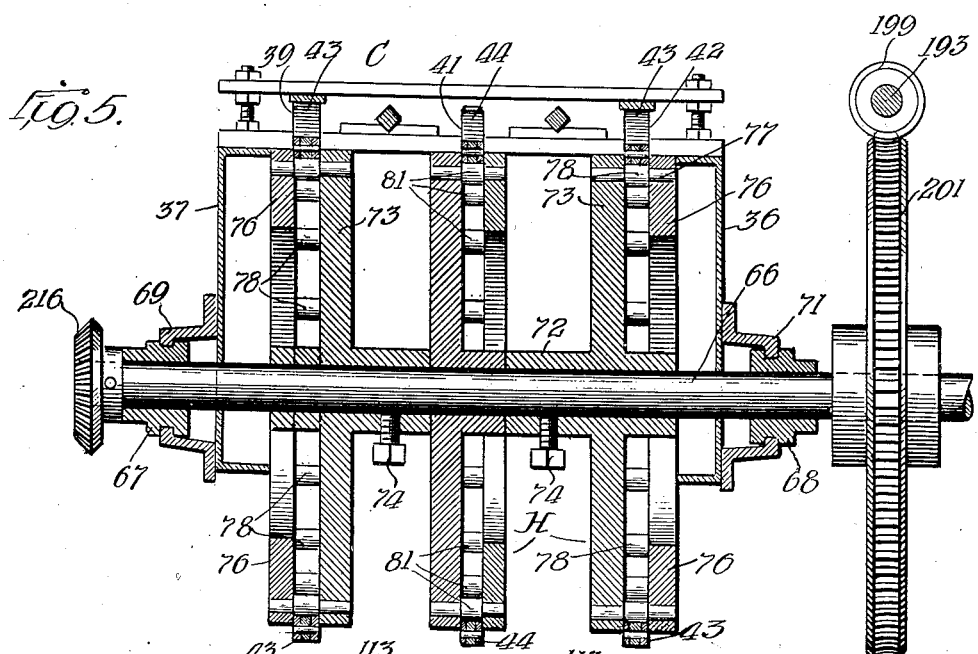
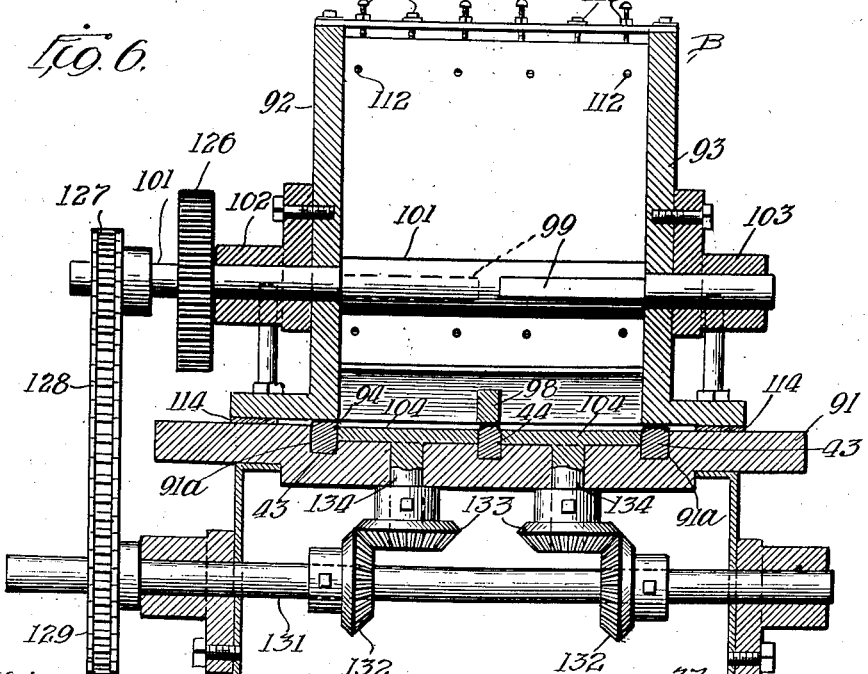

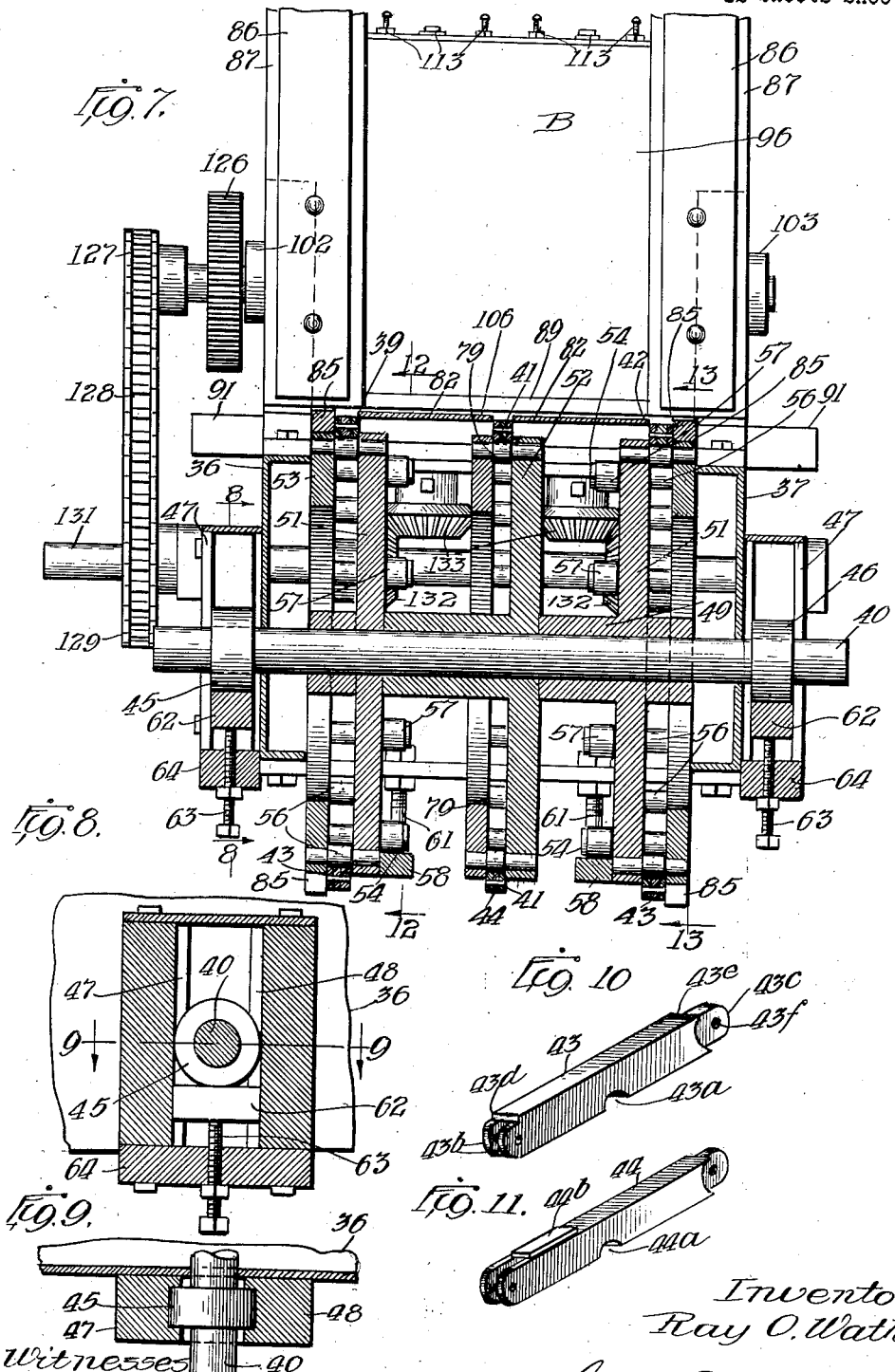

June 14, 1932.  R. O. WATKINS  1,863,175
GRID PASTING MACHINE
Filed June 27, 1929   12 Sheets-Sheet 9
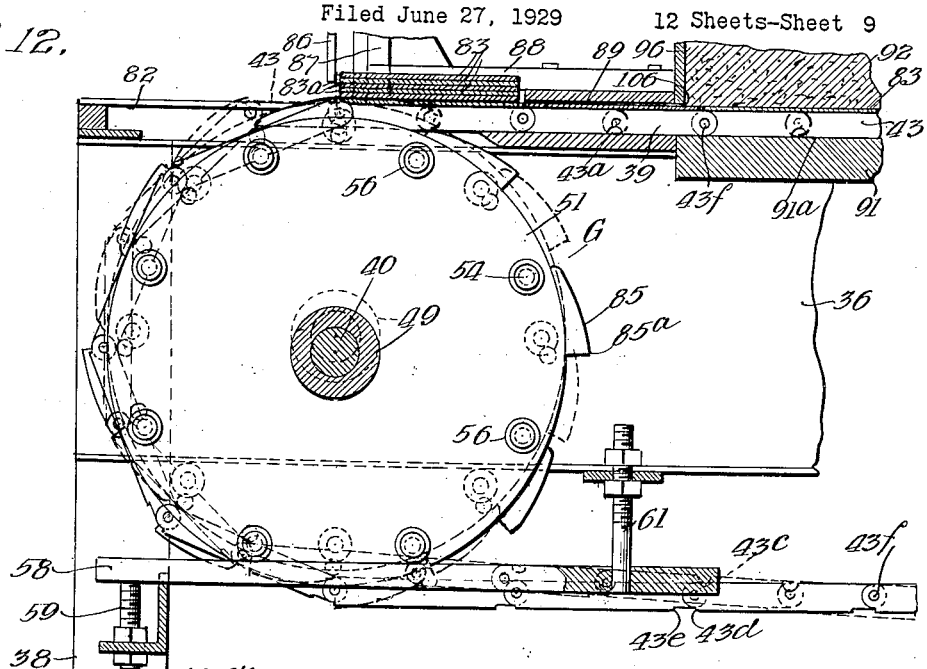
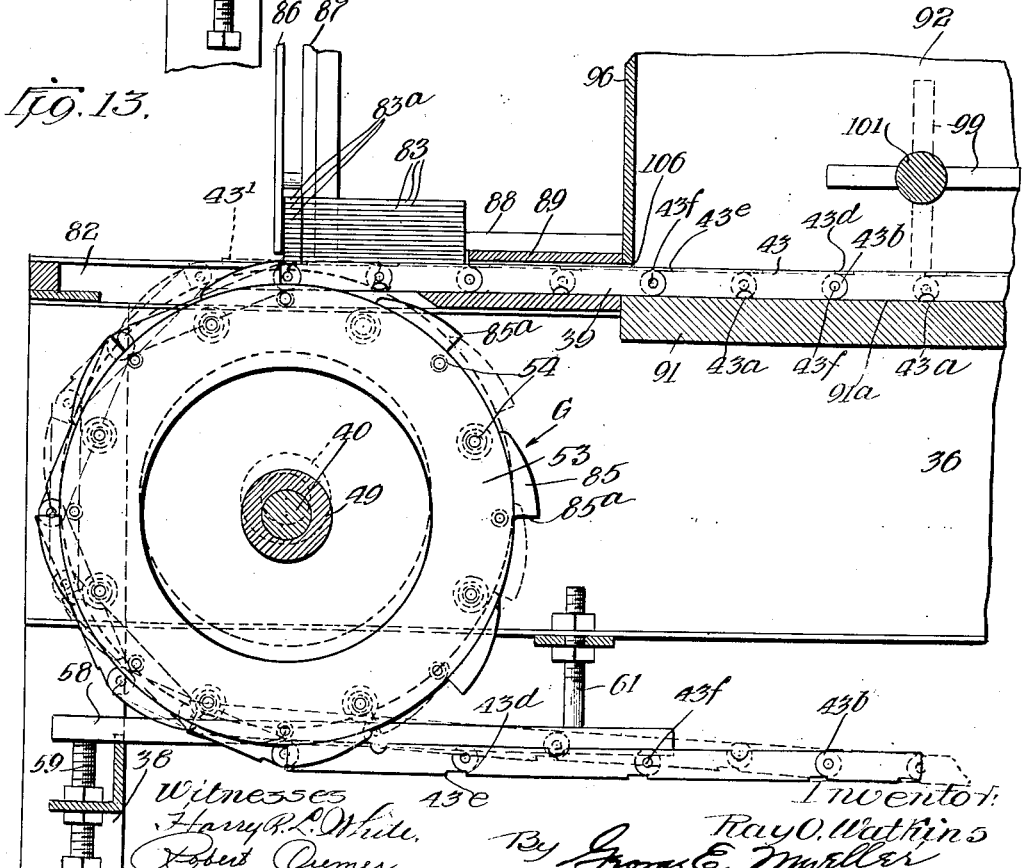

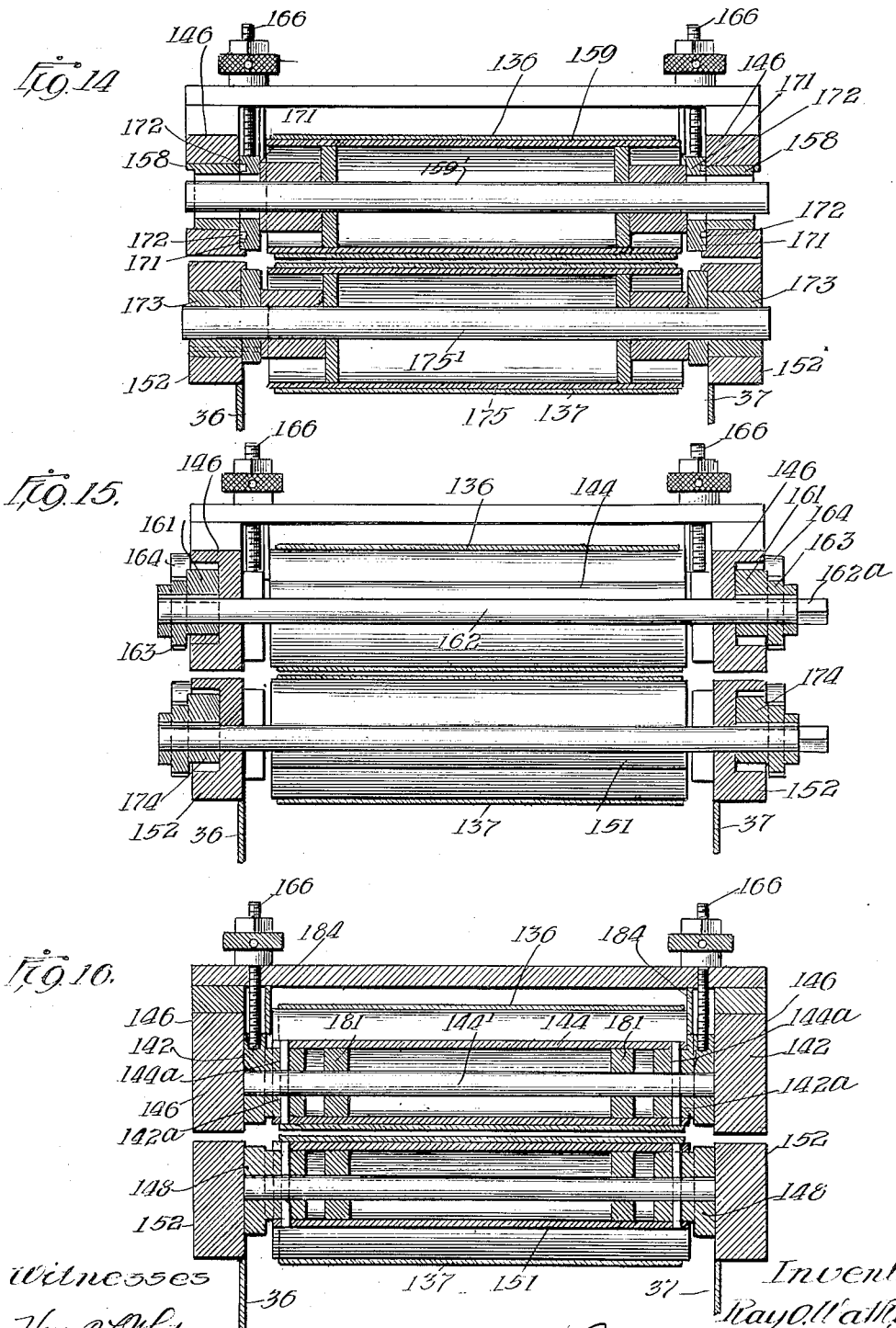

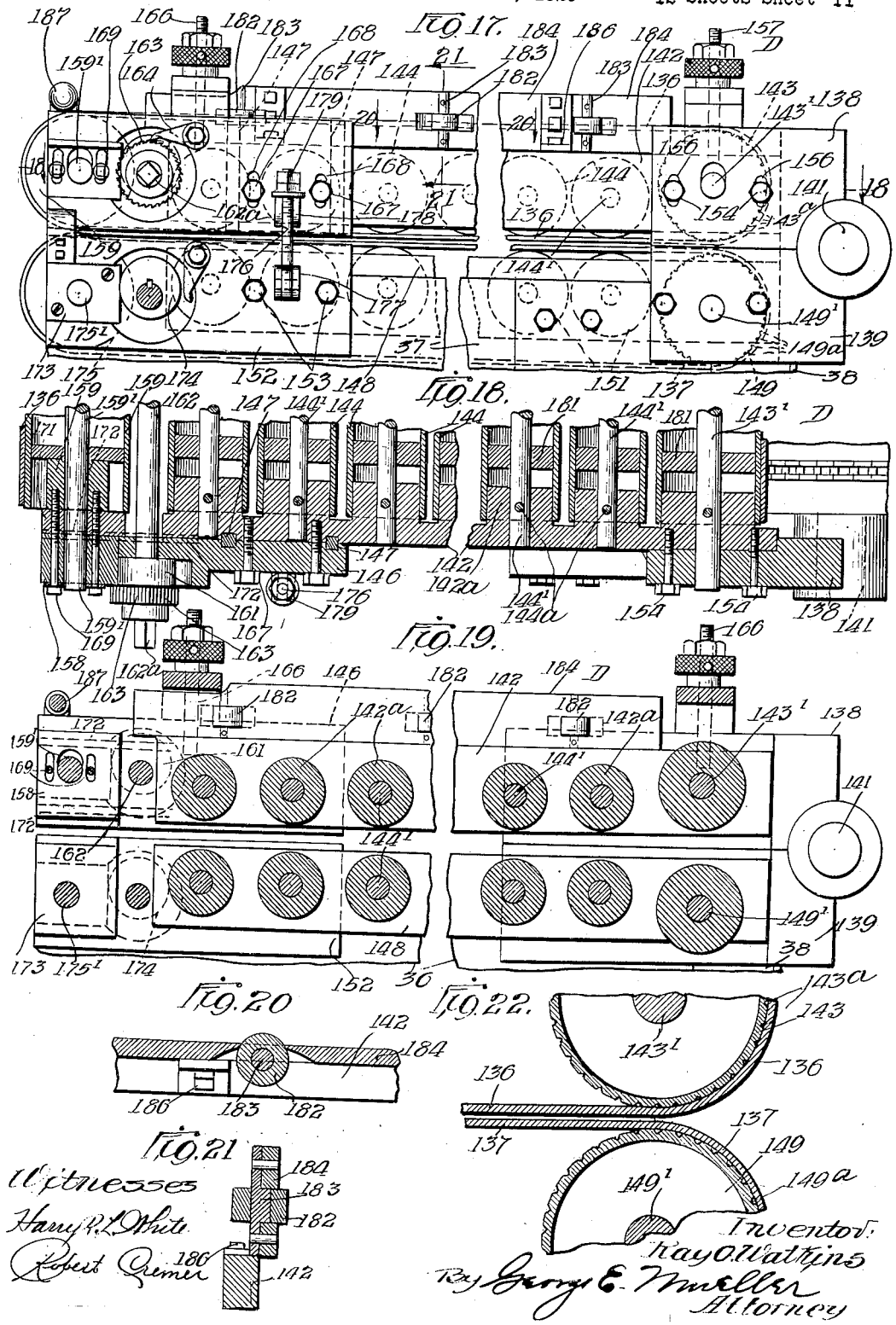

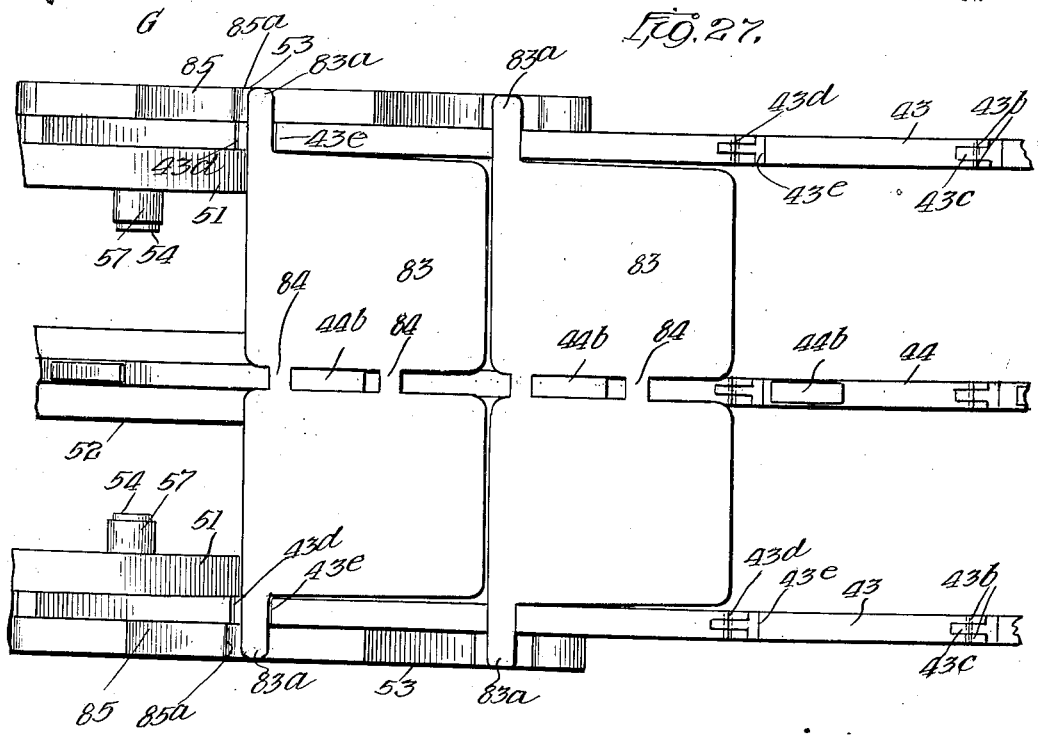
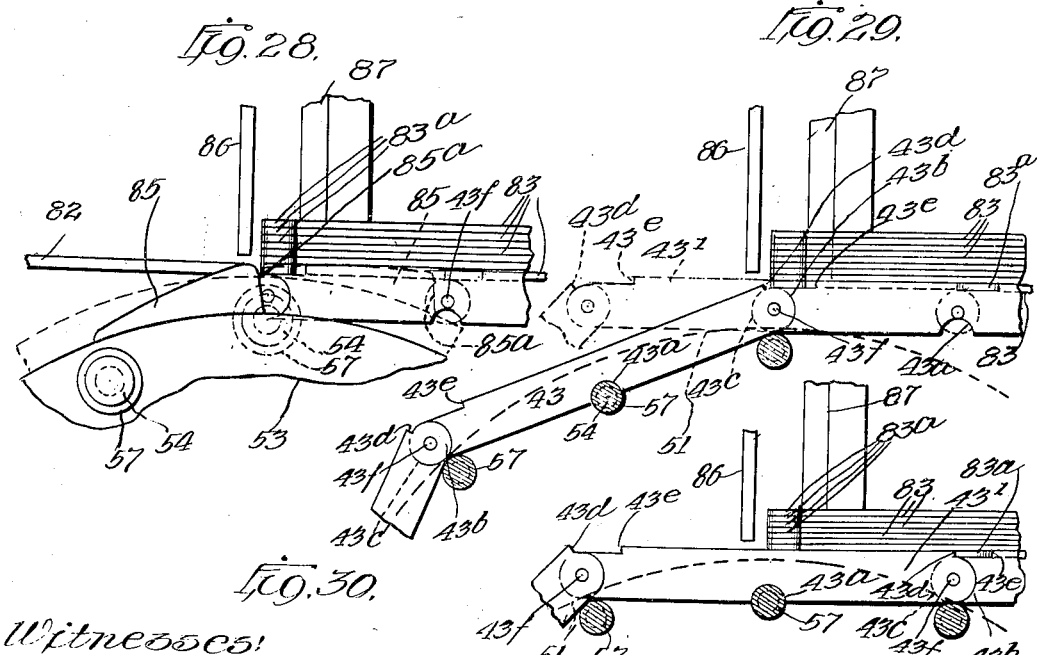

Patented June 14, 1932

1,863,175

UNITED STATES PATENT OFFICE

RAY O. WATKINS, OF CHICAGO, ILLINOIS, ASSIGNOR TO UNIVERSAL BATTERY COMPANY, OF CHICAGO, ILLINOIS, A CORPORATION OF ILLINOIS

GRID PASTING MACHINE

Application filed June 27, 1929. Serial No. 374,032.

My invention relates to improved mechanism for applying paste to storage battery grids. In the production of storage battery plates a grid of a suitable lead alloy is formed, and paste material is applied in a moist plastic condition to the grid to form a spongy metallic plate. The manner in which the paste is applied to the grid is of very great importance because it has a great influence on both the electrical and mechanical characteristics of the finished plate and the battery in which it is contained. This affects the electrical characteristics of the finished battery, the behavior of the battery during its normal life, and the duration of the normal life of the battery.

Pasting operations are performed either by hand or by machine. At the present writing, there has been a relatively large number of so-called pasting machines developed, some of them giving fairly satisfactory results, and others giving quite inferior results. Hand-pasting is preferable to most machine pasting, but is not fully satisfactory because it is more expensive and the plates produced are not uniform. For the best results, a good grade of skilled operator is required, and even here the results are not uniform. Most machines produce uniform plates, but unsatisfactory, for electrical and mechanical reasons. The principal disadvantage in the machine-pasted plates is that the paste is not distributed evenly throughout the interstices of the grid. The machine operation with every machine with which I am familiar, causes a greater compression of paste in some parts of the grid, than in others.

In addition to these disadvantages, the pasting machines are not sufficiently flexible and cannot be modified or regulated with sufficient flexibility to accommodate plates of various thicknesses. The result of this situation is that up to the development of my invention, the battery plates, produced on a commercial production scale, leave considerable to be desired electrically and mechanically, or, at the most, fail for lack of complete uniformity.

Accordingly, the principal object of my invention is the production of an improved storage battery plate on a production basis.

Another object is to produce storage battery plates of greater uniformity.

Another object is the production of a grid pasting machine, which will accommodate grids of various thicknesses.

Other objects and features of the invention will be apparent from a consideration of the following detailed description taken in connection with the accompanying drawings, wherein—

Fig. 1–1a is a side elevational view of the complete machine;

Fig. 2 is an elevational view taken from the opposite side of the machine, a part of the view being broken away to conserve space;

Fig. 3–3a is an enlarged plan view of the complete machine;

Fig. 4–4a is an enlarged vertical central sectional view taken along the lines 4—4 and 4a—4a of Figs. 3 and 3a;

Figs. 5 and 6 are transverse sectional views taken along the lines 5—5 and 6—6, respectively of Fig. 1;

Fig. 7 is a transverse sectional view taken along the lines 7—7 of Fig. 1, looking in the direction of the arrows and showing the starting position of the grids;

Fig. 8 is a fragmentary section taken along the line 8—8 of Fig. 7 and serving to illustrate a feature of the grid feed;

Fig. 9 is a fragmentary plan sectional view taken along the line 9—9 of Fig. 8;

Figs. 10 and 11 are perspective views of chain links employed to propel the grids through the greater portion of the machine;

Fig. 12 is a sectional view taken along the line 12—12 of Fig. 7 and showing the manner in which the grids are fed to the conveyor;

Fig. 13 is a similar view taken along the line 13—13 of Fig. 7;

Figs. 14, 15 and 16 are sectional views taken on Fig. 4a and showing the details of the grid pressing mechanism;

Fig. 17 is an enlarged fragmentary elevational view showing the plate pressing mechanism;

Fig. 18 is a fragmentary sectional view taken along the line 18—18 of Fig. 17 and showing the arrangement of the pressing rollers;

Fig. 19 is a sectional view through the pressing mechanism, taken along the line 19—19 of Fig. 3a;

Fig. 20 is a detail of the side belt guide forming a part of the pressing mechanism;

Fig. 21 is a similar view, the section being at right angles to Fig. 20;

Fig. 22 is an enlarged view of the driving rollers for the pressing mechanism;

Fig. 23 shows the manner in which the plates are discharged from the pressing portion of the mechanism onto a belt conveyor;

Fig. 24 is a sectional view taken along the line 24—24 of Fig. 23, showing the way in which the grids are disposed on the conveyor with a rack disposed in position to withdraw the grids from the conveyor;

Fig. 25 is a sectional view through the rack alone with a double grid resting thereon;

Fig. 26 is a perspective view of the rack;

Fig. 27 is an enlarged plan view showing the manner in which the grids are carried by the link conveyor;

Fig. 28 is an enlarged view showing the way the grids are taken from the stack when starting through the machine;

Figs. 29 and 30 are additional views showing the movement of the links with respect to the grids; and Fig. 31 is an enlarged view showing a detail of the paste-containing hopper.

With general reference to the machine, the grids are fed full automatically through the machine, pasted, pressed, and finally delivered to a rack of such a character as to be handled through the final stages of manufacture. The grids are progressed from a feeding position A, through a hopper B, by a link conveyor. At the position C, they are delivered to a pressing mechanism D, after which they are discharged on a continuous conveyor E, whence they are removed for drying and further treatment.

The link conveyor is so designed that absolutely faultless feeding and progression of the grids results; the hopper is so arranged that the grids are perfectly and uniformly pasted as they progress therethrough with the paste distributed evenly throughout the interstices thereof. The pressing mechanism is so arranged as to compress the paste within the grid with a direct downward and upward pressure, avoiding a rolling pressure, which would force the paste toward one side of the grid opening and cause an uneven distribution of paste. In connection with the conveyor E, I employ a rack F (Fig. 26), which is designed to remove all of the grids contained on the conveyor E.

First, with regard to the framework of the machine, which supports all portions of the apparatus. This comprises longitudinal members 36 and 37, supported by angular uprights 38—38 and spaced by suitably disposed transverse members, as the drawings show, but which members will not be referred to in detail.

Now, with regard to the link conveyor which originally receives the grids. This comprises three chain-like members 39, 41 and 42 (Fig. 7). These chain-like conveyor members are formed of links secured together by suitable pintles, the links having a distinctive shape, as shown in Figs. 10 and 11. The link 43, shown in Fig. 10, is employed to make up the conveyors 39 and 42, while the link 44, shown in Fig. 11, is employed to make up the conveyor 41. There are differences in the specific construction of these links, which will be explained as the description progresses, but in general they are of substantially the same characteristics, having the same length, etc.

The link conveyors 39 and 42 operate together, and since they are substantially identical, they will be described as a single conveyor, in order to simplify the description.

First, as to the continuous path which the conveyors take, they are trained around wheels in the nature of sprocket wheels, but having certain special details of construction, and extend from the position G to the position H (Figs. 1, 2 and 4). The wheel at the position G is the idler, while the wheel at the position H is the driving wheel. Wheel G contains a plurality of cams for supporting the stack of grids as the lowermost grid is extracted by the conveyor and is so mounted as to have a compound movement, causing the grid-engaging points of the grid-feeding cams and grid-clamping links to travel in a full horizontal position while in contact with the grids.

The details of this construction will be described. Wheel H, besides acting as a driver, is so arranged as to be regulated to adjust the tension of the conveyor and to secure other advantages. Fig. 7 is a vertical sectional view through the wheel G or idler and feeding wheel, while Fig. 5 is a section through the drive and tension-regulating wheel. Both of these views show the chain in section above and below the wheel.

Now, as to the details of the wheel G, reference will be had first to Figs. 7 to 13, inclusive. The wheel is mounted on a transverse shaft 40 extending through slots in the main frame 36 and 37 and having side rollers 45 and 46 integral therewith and disposed to ride in side guides 47 and 48 (Fig. 8). This arrangement permits vertical movement of the whole assembly on which the shaft 40 is mounted, and the manner and purpose of this movement will be brought out later. As to the construction of the wheel, a hub 49 is disposed at the central portion of the shaft and has integral circular plates 51—51 and 52 secured thereto. The plates 51 form a part of the wheel which supports the outside link conveyors, a ring 53 being secured to the plate 51 by pins 54, twelve in number, and the plate 51 and ring 53 being separated by spacers 56—56 disposed on the pins 54. The pins 54 project beyond the plate 51 on the inside thereof and carry rollers 57, which are employed to impart a cam movement to the entire wheel assembly, as will be pointed out.

Now, the spacers 56 act as pintles for the links 43, these links having a semi-circular cut-away portion 43a, into which the spacers or pintles 56 engage.

As to the vertical movement of the wheel assembly, this is accomplished through the rollers 57 riding along the horizontal cam member 58. This is shown in Fig. 7, but Figs. 12 and 13 illustrate the action with greater clearness. When one of the rollers 57 is on the dead center line, the wheel assembly is at its highest point, while when it is at such a distance off center that two rollers 57 engage the horizontal cam 58 at the same time, the wheel assembly is at its lowest point. This action is augmented by recessed cam surfaces 58a and 58b, into which the rollers ride when the wheel assembly is at its lowermost position. To adjust for this vertical movement of the wheel assembly, the cam member 58 is supported by bolts 59 and 61, secured to the frame and so arranged that the height of the member 58 can be regulated. This, of course, will determine the high point of movement of the wheel assembly.

As to the low position of the wheel assembly, this may be controlled by limiting the downward movement of the central shaft 40. The rollers 45 and 46, which bear in the slides 47 and 48, rest on blocks 62 (Figs. 7 and 8). These blocks slide in the guides and are supported on bolts 63 which are threaded into lower blocks 64, integrally secured to the guide members. Consequently, the height of the blocks 62 can be regulated and this in turn will determine the lowermost position which the wheel assembly can reach.

Before referring to the feeding function of the wheel assembly G, I shall treat of the wheel assembly H, which drives the entire feeding and conveying parts and which is shown in section in Fig. 5. This assembly makes use of a main transverse shaft 66, to the outside ends of which are secured grooved rollers 67 and 68, which serve as bearings for the shaft and are longitudinally adjustable in guideways 69 and 71. The construction of these guideways is shown in Figs. 1 and 2 in elevation and will be referred to more in detail later.

As to the wheel assembly proper, a central hub 72 is provided, having circular plates 73—73 secured thereto, or formed integral therewith, as appears most desirable. The hub 72 is keyed to the shaft, or in any suitable way made to turn therewith. In the drawings, I show set screws 74—74 for interconnecting these members. To form a support for the links, the outside plate 73 has secured thereto a ring 76, pins 77 being utilized for the purpose and having spacers 78 serving as pintles for engagement with the semi-circular recesses 43a in the links.

I have not referred to the wheel construction for carrying the conveyor chain 41, but this is substantially the same, as far as link-engaging portions are concerned, as the outside wheel portion. The construction includes pintles 79 on the assembly G (Fig. 7) and pintles 81 on the assembly H, the central links 44 having semi-circular recesses 44a for engaging these pintles.

It will be recalled that the conveyor forms part of the feeding mechanism. I shall now refer to Figs. 3 and 4, which show the support for the grids. A pair of flat bed members 82 are disposed longitudinally of the frame at the end thereof and are adapted to form a table or support for the grids. Instead of a single grid, a pair of grids 83 (Fig. 27) are secured together by connecting lugs 84, the terminal lugs 83a of the grids extending from the outside edges of the resulting grid assembly. When the grids are stacked, the lugs are disposed between guide members 86—86 and 87—87 and side guides 88—88 are provided for the stack, the bed members 82 extend under a front guide or baffle plate 89, which is disposed to have just sufficient clearance above the bed plates or stack-supporting table to permit a single grid to pass. The side guides 88—88 are also spaced to permit the lugs 83a to pass thereunder. The guides 87 have a terminus arranged to prevent all but the lowermost plate passing along under the plate 89.

Now, as to the feeding from the bottom of the stack, this is done by the links 43 (Figs. 10, 28 and 29). The link 43 has a pair of bifurcations 43b at the front end thereof and a single tongue 43c adapted to extend between the bifurcations. The front edge 43d engages the lower rear edge of the grid lug, to remove it from the bottom of the stack, and when in conveying position, the rear edge 43e engages the opposite edge of a lug.

Since the edges 43d and 43e are disposed away from the pivot point 43f of the links, they have a closing movement with respect to each other, as the link belt straightens out after passing over the sprocket wheel. In actual dimensions, I have determined that when the lug is engaged by the links, there is a three-quarter inch space between the edges 43d and 43e, but when the links assume a full horizontal position, as indicated by the character 43' in Fig. 30, this space closes up to approximately nine-sixteenths of an inch. This gives the lug ample clearance for dropping down into the gap in the conveyor belt between the links, but closes up the gap when passing through the hopper, etc., so that there is no possibility of paste being lost, or the belt being fouled by accumulated paste.

The links 43, from center to center, are obviously as long as the grids are high; for this reason, when the links move over the sprocket wheel, they do not have a full arcuate movement at all points of their travel. It is necessary that the edge 43b travels in a direct horizontal path when the grid lug is engaged. There is a tendency for it to move downwardly at this point, due partly to the motion of the link as a whole, as it moves about the pintle, and partly due to the movement of the links about their pivots 43f. To take care of this condition, the entire wheel assembly is made to move upwardly at this period, as described in connection with the cam member 58.

As soon as a grid has been engaged and started forward in a feeding position, there is a tendency for the grid stack to fall, and if this should result, more than one grid might be fed through at the same time, or other complications result. To overcome this possibility, I provide a series of cams 85, the leading edges 85a of which are disposed just behind the lug-engaging portion 43d of the associated link. It is just at this point that the entire wheel assembly is raised and this causes the cam surface to have such a trajectory with respect to the plate stack, as to support the stack as a whole. When the lowermost grid has been pushed forward and the cams (one at each side of the grid) pass out of holding position, the entire stack drops down by gravity and the lowermost grid is then ready to be fed forward by the next oncoming conveyor link. The center conveyor operates in substantially the same fashion as the two side conveyor members, but makes use of a top lug 44b, which engages behind a connecting lug 84 between the grids. This drives the grid assembly from three positions, thereby avoiding buckling or unequal strain on the grids as they are advanced through the machine.

The next operation performed on the grid is the pasting proper, which takes place in the paste-containing hopper. The hopper includes a bottom wall 91 (Fig. 6) extending entirely across and projecting beyond the frame members and having longitudinal slots 91a—91a in which the conveyor links pass, so that the grid can rest directly on the bottom wall of the hopper.

The hopper also has side walls 92 and 93, having a general L-shape, so as to leave a space 94 between the bottom walls and the side walls for the passage of the grid lugs. End walls 96 and 97 are provided and this completes a rectangular structure for containing the paste which is fed and applied to the grids. A longitudinal member 98 is also provided, spaced above the bottom wall, for protecting the middle conveyor from the paste. The side conveyors are, of course, protected by their position under the side walls 92 and 93.

For the purpose of forcing the paste in a downward direction into the grid openings, a plurality of paddles 99 are provided, each integral with its shaft 101, extending through the side walls of the hopper and having exterior bearings 102 and 103. Alternate paddles 99 are disposed to be driven in opposite directions, so that as the grids progress along the hopper bottom, the paste is applied in both longitudinal directions at least twice and a fair distribution of paste obtained.

Now, I also provide means for distributing the paste in the bottom part of the grid openings as it is forced therethrough by the upper paddles. This is in the form of circular plates 104, inset into the bottom wall and also disposed to turn in opposite directions and in pairs, the arrangement of the circular plates being shown in Fig. 3, and the arrows indicating the preferable direction for turning them.

It is obvious that as the grids pass over these revolving circular plates, every part of the lower grid surface will have had paste applied to it in every direction, so that a thorough distribution of the paste is obtained.

Now, the hopper is arranged so that the grids pass through a narrow horizontal slot or opening 106 at the head or receiving end of the hopper, while, at the discharge end of the hopper, a slot 107 is provided and this arrangement prevents the paste from escaping from the hopper at these points.

Now, at the opening 107, I provide an improved scraper arrangement which removes the excess paste cleanly and expeditiously from the grids. A lower scraper member 108 is provided, having a relatively sharp edge 108a, which engages the bottom part of the grid to impart a scraping operation thereto. Since the grid is in actual contact with the bottom of the hopper, however, very little, if any, paste has to be removed by the bottom scraper. For the top scraper, a sheet steel member 109 is provided, secured to the bottom of an adjusting member 111, this member being secured to the end wall 97 of the hopper by screws 112. Adjusting screws 113 are provided to adjust the elevation of the member 111. It is of great importance to have the scraping edges 108a and 109a adjusted accurately with respect to each other, to prevent the imparting of too much tipping action to the grids and to prevent the members from forcing material into or through the grid openings. If these two edges are directly in a line vertically with respect to each other, very satisfactory scraping action results.

It will be recalled that the machine is designed to accommodate grids of various thicknesses. This adjustment is obtained by means of liners 114 extending under the side walls 92 of the hopper. In other words, the entire upper guide assembly for the grids is simply raised or lowered to take care of various thicknesses of grids. This can be done very quickly with the construction I use, and I have obtained very good pasting results with grids varying from one-sixteenth of an inch to one-quarter of an inch in thickness.

In order to complete the description of the pasting mechanism, I shall now take up the driving mechanism, so that as far as the drive affects the pasting mechanism, the connection may be shown. I show two driving motors 116 and 117, which is the arrangement I have employed satisfactorily in a commercial machine, but, of course, a single drive means and the requisite connections can be employed.

For driving the pasting mechanism, the motor 117 alone is employed, connected by a belt 118 with a pulley 119, secured on shaft 121. This shaft, provided with suitable bearings, etc., has secured thereon a gear 122, driving a chain 123, which meshes with a gear 124, carried by one of the shafts 101. Each one of these shafts has a gear 126, so that there are four gears in number, all meshing with each other. The result is a drive at identical speed for the various shafts, but with alternate shafts traveling in opposite directions. It will be recalled that this was found to be the preferred manner of driving the shafts 101 with their paddles 99.

For driving the lower circular plates 104, a take-off is provided from two of the shafts 101 traveling in opposite directions, the shafts being provided with gears 127 which are connected by chains 128, driving gears 129. These gears, in turn, are integral with shafts 131, disposed below the hopper transversely thereof, and shafts 131 carry bevel gears 132 meshing with bevel gears 133, which are keyed on the vertical shafts 134, which form a part of the plates 104. As Fig. 6 shows, the bevel gears 132 face in opposite directions, so that the drive for adjacently placed circular plates 104 is in opposite directions, which is the most satisfactory arrangement.

The next operation after pasting the plates, as performed by the machine, is pressing them to make a more finished job, and to secure other advantages, which will be pointed out. I find, however, that as the plates are discharged from the hopper through the scraping edges provided at the outlet end thereof, they are in a substantially finished condition and could be placed into a battery without further treatment, except, of course, the usual assembly operations. The pressing mechanism has a number of features, the most important of which is in its function of pressing the grids with a direct vertical pressure,—that is, directly from above and directly from below, and without any rolling movement, which has a tendency to pack the paste against the side of the grid openings toward which the rolling takes place, while at the same time removing the paste from the opposite side of the grid openings.

Other features are the adjustability of the pressing means, using a matrix in contact with the paste, so that a greater active surface is obtained, and a certain resiliency of the pressing means, which makes it effective within the grid openings to impart a finished effect to the paste within such openings.

The pressing mechanism is seen in plan in Fig. 3a, and in elevation in Figs. 1 and 2, but the details thereof are best illustrated in Figs. 14 to 22, inclusive, to which reference may now be made.

The device includes a pair of belts 136 and 137, adapted to be driven over a series of rollers of a character to be described, the rollers being so arranged that the grids are fed between the belts without pressure, and the rollers being close together and gradually restricting the belts, a gradual and increased pressure directly vertical is applied to the grids.

Now, with regard to the actual construction of the pressing device, two pairs of main frames 138—138 and 139—139 are pivotally associated at 141—141. The construction is identical for both sides of the pressing mechanism, and in order to simplify the description, one side only will be referred to.

Refer now to Fig. 17. The upper main frame member 138 has, as a continuation thereof, a roller frame 142, which carries rollers 143 and 144—144, journaled therein. And end frame 146 forms a continuation of the frame 142 and is movable vertically with respect to the frame 142 on the key ways 147. Below, a roller frame 148 forms a continuation of frame 139 and carries rollers 149 and 151—151 journaled therein.

An end frame 152 forms a continuation of the frame construction and is secured rigidly to the frame 148 by cap screws 153—153.

The universal adjustment feature of the pressing device has been referred to, and I shall now take up the adjustment with respect to the upper or hinged portion of the pressing device. The rollers 144 and the roller 143, all of which are journaled in the roller frame 142, will, of course, be brought to adjustment with respect to the lower rollers by any movement of the frame 142. At the discharge end,—that is, the end adjacent the hinge or pivot 141, adjustment is obtained by reason of the cap screws 154, which are threaded into the frame 142 through slots 156 in the frame 138. An adjusting screw 157 is employed to obtain the adjustment, after which the screws 154 are tightened down to maintain such adjustment.

Now, as to the feeding end of the mechanism, let me first refer to the longitudinal adjustment,—that is, the adjustment for regulating the tension of the belt 136. The end frame 146 has an open end in which a block 158 is keyed to be slidable longitudinally. A roller 159 is journaled in this block, and the block itself is movable by means of a cam 161, keyed to a transverse shaft 162, this shaft having a square end 162a for receiving a turning tool and carrying a ratchet gear 163, which is engaged by pawl 164. This permits obtaining any required tension on the belt and holding the tension as long as the pawl 164 engages the ratchet wheel 163.

The feeding end of the pressing device is also vertically adjustable, the end frame 146 being movable on key ways 147, as previously described. The adjustment is obtained by means of an adjustment screw 166, and the adjustment is maintained by cap screws 167—167, which are threaded into the frame 142 through slots 168. In order to regulate the vertical position of the roller 159, a separate adjustment is provided therefor, bolts 169 extending through slots in the block 158 and engaging an auxiliary frame member 171, which is slidable in guideways 172 with respect to the end frame 146. It is to be observed that the shaft 159', bearing the roller 159, is also adapted to be moved vertically with respect to the block 158, but this block will not permit longitudinal or horizontal movement of the shaft with respect thereto.

Substantially the same construction is maintained in the bottom row of rollers, except that no special vertical construction is provided for, since this is unnecessary and can be obtained entirely with the upper rollers. The frame members are secured to the bed of the machine so as to maintain, at all times, the same general position with respect thereto. However, in order to adjust the tension of the lower belt, a slidable block 173 is provided, movable by a cam 174, which cam is driven and checked in the same way as described in the upper construction.

For maintaining the upper and lower roller assemblies in assembled position when in operation, I employ a fastening member 176, in the form of a screw or bolt, pivoted to a pair of ears 177, carried by one of the lower frame members, and adapted to be engaged above between the pair of ears 178, carried by the upper frame member, a nut and lock nut 179 serving to hold the bolt 176 in position.

While any suitable construction may be employed for the rollers, I prefer the arrangement indicated in Fig. 18. The frame member 142 is provided with a number of bosses or circular lugs 142a, projecting from the inside thereof and to which the roller shafts 144' are pivoted by means of pins 144a. The rollers are in the form of hollow shells or cylinders with inside bearing members 181, which bear on the shafts and turn with respect thereto. This construction provides the greatest amount of roller surface for the grids and protects all moving parts, etc.

As side guides for the upper belt, I provide side rollers 182—182, journaled on short vertical shafts 183—183 and inset into a guide frame 184. This guide frame is secured to the roller frame 142 by bolts 186, in the manner shown. A handle 187 is provided for raising the upper roller frame.

As a drive for the pressing mechanism, power is received from the motor 116, through a belt 188, to a pulley 189, carried by shaft 191. Shaft 191 carries a sprocket wheel 192 and movement thereof is imparted to an upper shaft 193 by a sprocket chain 194, which meshes with a sprocket wheel 196, carried by said shaft 193.

For the power take-off from this shaft 193, a worm gear 197 is secured to the lower roller shaft 175' and this is driven by a worm 198 disposed on one end of the shaft 193. A pair of spur gears meshing with each other, and carried respectively on shafts 149' and 143', serves to turn the two rollers and so drive the belts 136 and 137. The rollers 143 and 149 are provided with corrugations 143a and 149a, respectively, (Fig. 22), this preventing slippage between the rollers and belt and affording a surer driving engagement.

While discussing driving means, I shall return briefly to the grid-feeding conveyors, which are also driven from the shaft 193. This is accomplished by means of a worm gear 199, carried by the shaft 193 and meshing with a large worm gear 201, which is keyed to the shaft 66, forming a part of the wheel assembly H, over which the conveyors 39, 41 and 42 are trained.

Having mentioned the driving connection for the grid-carrying conveyor, I shall now refer briefly to the tension-regulating mechanism therefor, which it will now be understood, is operable without interfering with the drive. The floating bearings 67 and 68 are horizontally reciprocable in guideways 69 and 71, as was previously explained. Now, adjusting screws 202 and 203 are pivotally connected to the sliding or floating bearings and are threaded in blocks 204 and 206, which are secured to the stationary guideways. Consequently, by turning handles 207 or 208, as the case may be, the position of the shaft 66 can be controlled. Obviously the character of the connection between worm 199 and worm gear 201 will permit adjustment of this shaft by this means without difficulty.

Now, to return to the pressure mechanism. In the adjustment thereof, the rollers 159 and 175 are so spaced as to receive a grid or line of grids for pressing purposes, and transfer the same between the belts to the rollers following them, between which rollers they are gradually pressed. The rollers are very close together and the belts are of relatively heavy material so that the effect of a direct pressure without rolling is obtained.

As to the material of the belt, this may vary, but I have found my best results to be with a heavy doubled canvas over which is placed a single layer of cheese cloth, which comes in contact with the plates. The heavy doubled canvas has sufficient flexibility, but just enough stiffness to overcome the effect of the individual rolls, while the cheese cloth, or other cloth which might be used for the purpose, acts as a matrix, introducing its pattern to the surface of the paste, so that a greater active surface is obtained.

From the pressure mechanism, the grids are delivered to a conveying mechanism in the form of a pair of chains 209 and 211 (Fig. 3a) which are arranged to be driven at a relatively slow rate of speed, so that successive grids are hanging from the conveyor, as shown in Fig. 23, and will be spaced a slight distance from each other.

The chains 209 and 211 are trained around sprocket gears 212—212 and 213—213, respectively. These members are suitably secured and journaled in frame members of any proper construction. The gears 213 are carried on separate shafts, while the gears 212 are both keyed to a shaft 214, which is turned to drive the gears 212 and with them the conveyor chains 209 and 211. Fig. 2 shows the drive for this shaft. The shaft 66 (Fig. 5), which is driven by the gear 201, has at the opposite end thereof a bevel gear 216, meshing with the bevel gear 217, carried on a longitudinally disposed shaft 218. This shaft has its bearings in brackets 219—219 and has a projecting end which carries a worm 221 meshing with the worm gear 222 carried on the shaft 214. It is clear that a considerable speed reduction is obtained by this construction and, in actual practice, it works out to a sufficiently low speed for the chains 209 and 211 to secure the result desired.

For feeding the grids to the chains 209 and 211, a pair of inclined chutes 223 are provided, of sheet metal, and so arranged as to engage the lugs 83a on the grids and permit the grids to slide down their inclined upper surfaces into position on the chains 209 and 211.

As explained in the preliminary paragraphs, the bracket F is employed to lift a group of grids from the conveyor chains 209 and 211 and support the grids during further work thereon. Fig. 26 shows the details of this bracket. It comprises a pair of longitudinal members 224 and 226 in the form of angle irons and secured together by cross pieces 227 and 228.

The chains 209 and 211 are arranged so that the grid lugs 83a project some distance therefrom and this projecting portion of the lugs is adapted to be engaged by the horizontal portions of the longitudinal members 224 and 226 (Figs. 24 and 25), so that all of the grids on the chains can be lifted up at the same time. To each one of the cross pieces 226 and 227, is secured a hook 229, the hooks being secured on bars of the dryer conveyor so that the entire bracket, loaded with pasted grids, is progressed through the dryer by the conveyor.

The link conveyor chains 39, 41 and 42 are protected throughout their travel while in contact with the grids, but in order to avoid any possibility of these chains becoming fouled, I provide a washing mechanism therefor (Figs. 4 and 4a). A water pump 232 is driven by a chain 233 with power taken from the shaft 191. The discharge side of the pump is connected to a pipe 234 leading to positions above and below the link chains and regulated to spray the links from top and bottom by water 236. This water is controlled so as to be trapped in a sump 237 and a return pipe 238 takes the water from the sump and returns it to the intake side of the water pump.

The operation of the machine appears to be clear from the preceding description and no detailed explanation of the operation will be made. Briefly, however, it may be stated that the grids are stacked with their lugs between the uprights 86 and 87. They are fed, one at a time, from the bottom by the link conveyors, and the link conveyors are arranged to bring the grids in close engagement with each other, but still each individual grid is propelled from the two lugs and center by the conveying links.

The cams on the idler sprocket wheel aid in the feeding principally by supporting the stack of grids until the lowermost grid has been entirely removed from underneath the stack. Inside the hopper, the grids are pasted from the top, but with the paste distributed on the bottom in such a manner as to get a thoroughly even distribution and identical pasting results on all the grids. The grids, as discharged from the hopper, with the excess paste scraped therefrom, are in substantially finished condition. The machine, however, advances them to the pressing mechanism, where they are squeezed between two heavy belts with a direct vertical pressure of gradually increasing force. When discharged, they move along two chain conveyors suspended from the lugs and spaced a fraction of an inch apart. The rack picks an entire group of grids up at one time and is provided with means for fastening the rack to the dryer conveyor so that the grids are not handled individually, but in groups, throughout the drying process. When they have been thoroughly dried, they can be cut and burned into groups for assembling, as in the ordinary process.

The use of the machine is, of course, not dependent on any particular kind of drying, as the plates may, if desired, be assembled wet. I have found that I can obtain the best results, however, by this process, since I can run all thicknesses of plates on my machine with very little change therein, and I accordingly adopt a uniform process for all types of plates.

What I claim as new and desire to protect by United States Letters Patent is:

1. In a grid pasting machine, a paste containing hopper with a horizontal bottom wall, an imperforate circular plate inset into the bottom wall so as to form a continuous, flat grid bearing surface, means for continuously advancing the grids through the hopper and along such surface, means for forcing the paste down into the grids, and means for turning the circular plate to distribute the paste in the under side of the grid.

2. In a grid pasting machine, a hopper for containing paste, and having a horizontal bottom wall, ends and side walls, narrow slit openings in the ends just above the bottom wall, means for moving the grids continuously through the hopper by means of said narrow end openings, paste propelling means for forcing the paste downwardly into the grids as they progress along the bottom wall, a plurality of circular plates set in the bottom wall and means for rotating said circular plates to distribute the paste throughout the grid openings on the lower side of the grids.

3. In a grid pasting machine, a hopper for containing paste, and having a horizontal bottom wall, ends and side walls, narrow slit openings in the ends just above the bottom wall, means for moving the grids continuously through the hopper through said narrow end openings, paste propelling means for forcing the paste downwardly into the grids as they progress along the bottom wall, a plurality of circular plates set in the bottom wall, means for rotating said circular plates to distribute the paste throughout the grid openings on the lower side of the grids and means for removing excess paste from top and bottom of the grids as they leave the hopper.

4. In a grid pasting machine, a hopper for containing paste, and having a horizontal bottom wall, ends and side walls, narrow slit openings in the ends just above the bottom wall, means for moving the grids continuously through the hopper through said narrow end openings, paste propelling means for forcing the paste downwardly into the grids as they progress along the bottom wall, a plurality of circular plates inset in the bottom wall means for rotating said circular plates to distribute the paste throughout the grid openings on the lower side of the grids, means for removing excess paste from top and bottom of the grids as they leave the hopper and means for pressing the paste into the grids with a direct inward pressure to complete the pasting operation.

5. In a grid pasting machine, a link conveyor, means for supporting a stack of grids in a position to be picked up individually by the conveyor, a paste containing hopper, means for driving the conveyor at constant speed to move the grids continuously through the hopper, means for applying paste downwardly to the grids and distributing the applied paste from all directions while in the hopper and scraping means for removing excess paste from both sides of the grids as they leave the hopper.

6. In a grid pasting machine, a link conveyor, means for supporting a stack of grids in a position to be picked up individually by the conveyor, a paste containing hopper, means for driving the conveyor at constant speed to move the grids continuously through the hopper, means for applying paste downwardly to the grids and distributing the applied paste from all directions while in the hopper and a pressing mechanism for receiving the grids as they leave the conveyor and imparting a substantially direct vertical pressure to the paste in the grid openings.

7. In a grid pasting machine, a link conveyor, means for supporting a stack of grids in a position to be picked up individually by the conveyor, a paste containing hopper, means for driving the conveyor at constant speed to move the grids continuously through the hopper, means for applying paste downwardly to the grids and distributing the applied paste from all directions while in the hopper, a pressing mechanism for receiving grids as they leave the conveyor and imparting a substantially directly vertical pressure to the paste in the grid openings, and a slow moving conveyor for receiving the grids as they leave the pressing mechanism, said conveyor adapted to support the grids by their lugs in a hanging position.

8. In a grid pasting machine, a paste hopper, means for passing grids through the hopper, means for applying paste to the grids in the hopper, and a pressing mechanism for pressing the grids as they leave said hopper, said mechanism comprising top and bottom pressing means, each pressing means including a plurality of rollers laid side by side in a horizontal line and close together, a roller frame in which all but one roller are journalled, means for adjusting the frame bodily to control the pressure applied to the grids, a heavy but flexible belt extending around the rollers and means for adjusting the roller which is not carried by the frame in a horizontal direction to control the tension of the belt.

9. In a grid pasting machine, a paste hopper, means for passing grids through the hopper, means for applying paste to the grids in the hopper, and a pressing mechanism for pressing the grids as they leave said hopper, said mechanism comprising top and bottom pressing means, each pressing means including a plurality of rollers laid side by side in a horizontal line and close together, a roller frame in which all but one roller are journalled, means for adjusting the frame bodily to control the pressure applied to the grids, a heavy but flexible belt extending around the rollers, means for adjusting the roller which is not carried by the frame in a horizontal direction to control the tension of the belt and separate means for regulating the vertical position of such roller.

10. In a grid pasting machine, a paste hopper, means for passing grids through the hopper, means for applying paste to the grids in the hopper, and a pressing mechanism for pressing the grids as they leave said hopper, said mechanism comprising top and bottom pressing means, each pressing means including a plurality of rollers laid side by side in a horizontal line and close together, a roller frame in which all but one roller are journalled, means for adjusting the frame bodily to control the pressure applied to the grids, a heavy but flexible belt extending around the rollers, means for adjusting the roller which is not carried by the frame in a horizontal direction to control the tension of the belt, such roller and the companion roller in vertical alignment therewith being spaced apart sufficiently to permit easy entrance of the grids without substantial pressure, and the roller frame being adjusted so that a gradually increasing pressure is imparted to the grids as they move forward between the belts.

11. In a grid pasting machine, a paste hopper, means for passing grids through the hopper, means for applying paste to the grids in the hopper, and a grid pressing mechanism for pressing the grids as they leave said hopper, said mechanism including main frame members pivoted with respect to each other, roller frames adapted to be positioned with respect to the pivoted frame members, rollers journalled in the frames and lying side by side in generally horizontal position, blocks slidably held in continuations of the main frame members, separate rollers journalled in the blocks, a pair of belts extending around the sets of rollers, and means for adjusting the positions of said blocks to control the tension of the belts.

12. In a grid pasting machine, a paste hopper, means for passing grids through the hopper, means for applying paste to the grids in the hopper, and a grid pressing mechanism for pressing the grids as they leave said hopper, said mechanism including main frame members pivoted with respect to each other, roller frames adapted to be positioned with respect to the pivoted frame members, rollers journalled in the frames and lying side by side in generally horizontal position, blocks slidably held in continuations of the main frame members, separate rollers journalled in the blocks, a pair of belts extending around the sets of rollers, means for adjusting the positions of said blocks to control the tension of the belts, and means for driving the rollers and belts to move the grids therethrough in a direction toward the frame pivots.

13. In a grid pasting machine, a paste hopper, means for passing grids through the hopper, means for applying paste to the grids in the hopper, and a grid pressing mechanism for pressing the grids as they leave said hopper, said mechanism including main frame members pivoted with respect to each other, roller frames adapted to be positioned with respect to the pivoted frame members, rollers journalled in the frames and lying side by side in generally horizontal position, blocks slidably held in continuations of the main frame members, separate rollers journalled in the blocks, a pair of belts extending around the sets of rollers, means for adjusting the positions of said blocks to control the tension of the belts, means for driving the rollers and belts to move the grids therethrough in a direction toward the frame pivots, and means for positioning the rollers vertically within said blocks so that the grids may be received substantially without pressure, the roller frames being set with respect to each other to impart a gradually increasing pressure to the grids.

14. In a grid pasting machine, a grid pasting hopper, means for supporting a stack of grids near the hopper, and a conveyor extending under the stack and adapted to engage and remove the lowermost grid from the stack and feed the grids continuously through the hopper, said conveyor including a pair of wheel assemblies, conveyor chains disposed around the wheel assemblies and including grid engaging links substantially as long as the width of the grids, and means for periodically raising and lowering one of the wheel assemblies to facilitate removal of the grids from the bottom of the stack.

15. In a grid pasting machine, a grid pasting hopper, means for supporting a stack of grids near the hopper, and a conveyor extending under the stack and adapted to engage and remove the lowermost grid from the stack and feed the grids continuously through the hopper, said conveyor including a pair of wheel assemblies, conveyor chains disposed around the wheel assemblies, and means forming a part of a wheel assembly for supporting the stack of grids as the lowermost grid is being removed from the stack.

16. In a grid pasting machine, for handling and pasting grid assemblies in the form of two grids with a center bond, and with lugs at the sides, a pasting hopper, means for supporting a stack of grid assemblies near the hopper, and a conveyor including three link belts, the two side links adapted to grip the lugs, and the center belt adapted to engage said center bond for removing the grid assemblies from the stack and passing the same through said hopper.

17. In a grid pasting machine a link conveyor, means for supporting a stack of grids in a position to be picked up individually by the conveyor, a paste containing hopper, means for driving the conveyor at constant speed to move the grids continuously through the hopper, means for applying paste downwardly to the grids and distributing the applied paste from all directions while in the hopper, and means for continuously supplying the conveyor links with water after their emergence from the hopper, whereby the conveyor links are prevented from fouling and are adapted to pick up the grids positively, 18. In a grid pasting mechanism, means for supporting a stack of grids, a pair of wheel assemblies, link chains passing around said wheel assemblies having links as long from pivot to pivot, as the width of the grids, said links being generally flat and having cutaway portions for receiving the grid lugs to engage the grids and hold them edge to edge in a continuous line, a pasting hopper, and means for driving the wheel assemblies to move the chains continuously to progressively engage and remove the lowermost grid and propel the continuous line of grids through the pasting hopper, and mechanism for applying paste to the grids within the hopper, the operation of the pasting mechanism being facilitated by the edge to edge position of the grids, whereby paste is also conserved.

19. In a grid pasting machine, a paste containing hopper, means for supporting a stack of grids in advance of the hopper, a pair of link chains having links substantially as long from pivot to pivot, as the width of the grids, means for driving the chains, means on the links for engaging the grids to remove a single grid from the stack, and means for causing the grid engaging means to move horizontally during the entire time it is in engagement with the grids, the pivot and grid engaging means on the links being so disposed with respect to each other that after each grid is engaged it is moved forwardly to engage its front edge with the rear edge of the adjacent grid said grids passing edge to edge through the hopper, and paste applying means within the hopper.

20. In a grid pasting machine, a grid pasting hopper having slits large enough to pass a grid, means for supporting a stack of grids adjacent the hopper, a pair of wheel assemblies, one pivoted below the stack of grids and the other in advance of the hopper, link chains having links substantially as long as the grids are wide, the links having recessed portions intermediate the pivots, lugs on the wheel assemblies for engaging the recessed portions to drive the link chains, and means near the pivot points of the links for engaging grids and removing grids one by one from the stack to form a continuous line of grids, said grids being advanced through the hopper in a continuous line while still in contact with the links said grids passing edge to edge through the hopper, and paste applying means within the hopper.

21. In a grid pasting machine, a grid pasting hopper having slits large enough to pass a grid, means for supporting a stack of grids adjacent the hopper, a pair of wheel assemblies, one pivoted below the stack of grids and the other in advance of the hopper, link chains having links substantially as long as the grids are wide, the links having recessed portions intermediate the pivots, lugs on the wheel assemblies for engaging the recessed portions to drive the link chains, means near the pivot points of the links for engaging grids and removing grids one by one from the stack to form a continuous line of grids, said grids being advanced through the hopper in a continuous line while still in contact with the links, and means for raising and lowering the wheel assembly below the grid stack to cause the grid engaging means to move in a full true horizontal position while in contact with a grid said grids passing edge to edge through the hopper, and paste applying means within the hopper.

22. In a grid pasting machine, a grid pasting hopper having slits large enough to pass a grid, means for supporting a stack of grids adjacent the hopper, a pair of wheel assemblies, one pivoted below the stack of grids and the other in advance of the hopper, link chains having links substantially as long as the grids are wide, the links having recessed portions intermediate the pivots, lugs on the wheel assemblies for engaging the recessed portions to drive the link chains, means near the pivot points of the links for engaging grids and removing grids one by one from the stack to form a continuous line of grids, said grids being advanced through the hopper in a continuous line while still in contact with the links, rollers carried by the wheel assembly below the grids between the link engaging lugs, and means for engaging the rollers to intermittently raise and lower the entire wheel assembly to cause the grid engaging means on the links to move in a horizontal path while in contact with the grids said grids passing edge to edge through the hopper, and paste applying means within the hopper.

23. In a grid pasting machine, a grid pasting hopper having slits large enough to pass a grid, means for supporting a stack of grids adjacent the hopper, a pair of wheel assemblies, one pivoted below the stack of grids and the other in advance of the hopper, link chains having links substantially as long as the grids are wide, the links having recessed portions intermediate the pivots, lugs on the wheel assemblies for engaging the recessed portions to drive the link chains, means near the pivot points of the links for engaging grids and removing grids one by one from the stack to form a continuous line of grids, said grids being advanced through the hopper in a continuous line while still in contact with the links, and cams carried by the wheel assemblies for holding the stack in elevated position until the grid being fed forward has entirely cleared the stack said grids passing edge to edge through the hopper, and paste applying means within the hopper.

24. In a grid pasting machine, a grid pasting hopper having slits large enough to pass a grid, means for supporting a stack of grids adjacent the hopper, a pair of wheel assemblies, one pivoted below the stack of grids and the other in advance of the hopper, link chains having links substantially as long as the grids are wide, the links having recessed portions intermediate the pivots, lugs on the wheel assemblies for engaging the recessed portions to drive the link chains, means near the pivot points of the links for engaging grids and removing grids one by one from the stack to form a continuous line of grids, said grids being advanced through the hopper in a continuous line while still in contact with the links, rollers carried by the wheel assembly below the grids between the link engaging lugs, means for engaging the rollers to intermittently raise and lower the entire wheel assembly to cause the grid engaging means on the links to move in a horizontal path while in contact with the grids, and cams carried by the wheel assemblies for holding the stack in elevated position until the grid being fed forward has entirely cleared the stack said grids passing edge to edge through the hopper, and paste applying means within the hopper.

In witness whereof, I hereunto subscribe my name this 8th day of June, 1929.

RAY O. WATKINS.